United States Patent
Kato

(10) Patent No.: US 11,301,675 B2
(45) Date of Patent: Apr. 12, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Natsuki Kato, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/864,421

(22) Filed: May 1, 2020

(65) Prior Publication Data

US 2020/0356769 A1   Nov. 12, 2020

(30) Foreign Application Priority Data

May 9, 2019   (JP) .............................. JP2019-089139

(51) Int. Cl.
*G06K 9/00* (2006.01)
*G06F 3/12* (2006.01)

(52) U.S. Cl.
CPC ....... *G06K 9/00456* (2013.01); *G06F 3/1256* (2013.01)

(58) Field of Classification Search
CPC .......................... G06K 9/00456; G06F 3/1256

USPC ......................................... 358/1.1, 1.9, 1.15
See application file for complete search history.

(56) References Cited

U.S. PATENT DOCUMENTS

2006/0274388 A1\* 12/2006 Miyazawa ......... H04N 1/00411
                                                            358/527
2021/0192200 A1\*  6/2021 Sugimoto .......... G06K 9/00449

FOREIGN PATENT DOCUMENTS

JP          2005-234790          9/2005

\* cited by examiner

*Primary Examiner* — Quang N Vo
(74) *Attorney, Agent, or Firm* — Venable LLP

(57) ABSTRACT

A technique in the present disclosure makes it possible to accurately obtain a value selected by a user with respect to a selection-type item for which a legend is prepared in a situation where a value entered in a document is extracted from a scanned image of the document. An item name is extracted from a document image, input information input by a user is extracted from the document image, and a legend is extracted from the document image. Additionally, in a case where the input information is unsuitable as a value corresponding to the item name, the value corresponding to the item name is obtained based on the legend and the input information.

12 Claims, 7 Drawing Sheets

IMAGE PROCESSING APPARATUS, IMAGE PROCESSING METHOD, AND STORAGE MEDIUM

BACKGROUND OF THE INVENTION

Field of the Invention

The present disclosure relates to a technique for analyzing a document entered in image data to acquire document information.

Description of the Related Art

There has conventionally been a method in which a paper document such as a business form is scanned to be digitized and the digitized document is subjected to optical character recognition processing (OCR processing) to extract character information, thereby acquiring contents described in the paper document. A widely known technique includes using this method to obtain an item name (key) and a value thereof from, for example, a receipt, an acknowledgment, or a written request for payment. Additionally, in such a technique, there is a proposed method of obtaining a value selected by a user with respect to a selection-type item such as a check box (see Japanese Patent Laid-Open No. 2005-234790). In the method disclosed in Japanese Patent Laid-Open No. 2005-234790, a scanned image of a business form is compared to a prestored business-form format to identify the area of a check box and obtain a value entered in the check box.

However, in a selection-type item for which a legend such as "1: MALE 2: FEMALE" is prepared, a value selected by a user is entered in an area different from an area in which the legend is entered. For this reason, the area in which the legend is entered cannot be identified using the method disclosed in Japanese Patent Laid-Open No. 2005-234790. Even assuming that the position of the legend can be identified, it is impossible to obtain a value ("1" or "2" described above) selected by a user with respect to the legend.

Thus, an object of the present invention is to make it possible to accurately obtain a value selected by a user with respect to a selection-type item for which a legend is prepared in a situation where a value entered in a document is extracted from a scanned image of the document.

SUMMARY OF THE INVENTION

The technique in the present disclosure is directed to an image processing apparatus comprising: at least one memory that stores a program; and at least one processor that executes the program to perform: extracting an item name from a document image; extracting input information input by a user from the document image; extracting a legend from the document image; and obtaining, in a case where the input information is unsuitable as a value corresponding to the item name, the value corresponding to the item name based on the legend and the input information.

Further features of the present invention will become apparent from the following description of exemplary embodiments with reference to the attached drawings.

DESCRIPTION OF THE EMBODIMENTS

Embodiments for carrying out the present invention will hereinafter be described with reference to the drawings. Incidentally, the following embodiments do not limit the invention claimed in the scope of claims, and all combinations of features described in the embodiments are not necessarily combinations essential to solving means of the invention.

First Embodiment

First, a description will be given of a configuration of an image processing system including an image processing apparatus according to a first embodiment. Next, a description will be given of a configuration and operation of an image analysis unit, which is a main unit of the image processing apparatus according to the first embodiment. Configuration of image processing system.

Figure 1:
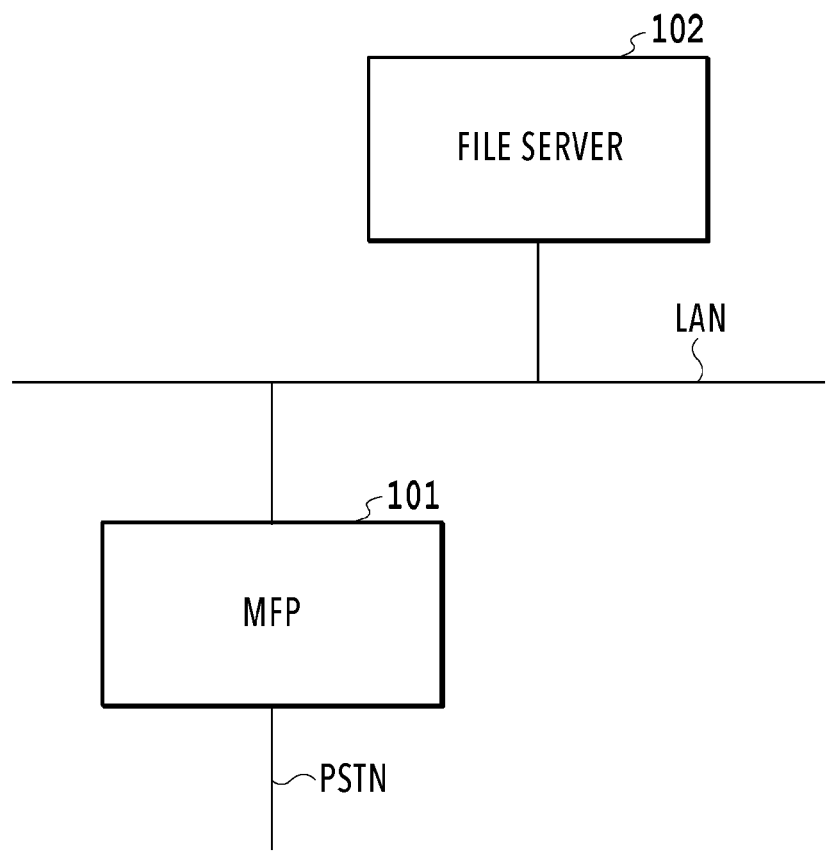
FIG. 1 is a block diagram showing an example of an overall configuration of an image processing system according to a first embodiment.

FIG. 1 is a block diagram showing an example of an overall configuration of the image processing system according to the first embodiment. The image processing system includes an MFP (multi function peripheral) 101 and a file server 102. The MFP 101 and the file server 102 are communicably connected to each other via a local area network (LAN).

The MFP 101, which is a composite machine including multiple functions such as scanner and printer functions, is an example of the image processing apparatus. The file server 102 is an example of an external server that stores and manages digitized document files. The image processing system according to the present embodiment is configured to include the MFP 101 and the file server 102 but is not limited to this configuration. For example, the MFP 101 may also have a role of the file server 102. Additionally, the MFP 101 and the file server 102 may be connected via, for example, the Internet, in place of the LAN. Moreover, the MFP 101 can perform facsimile communication of image data with a facsimile device (not shown) via a public switched telephone network (PSTN).

Figure 2:
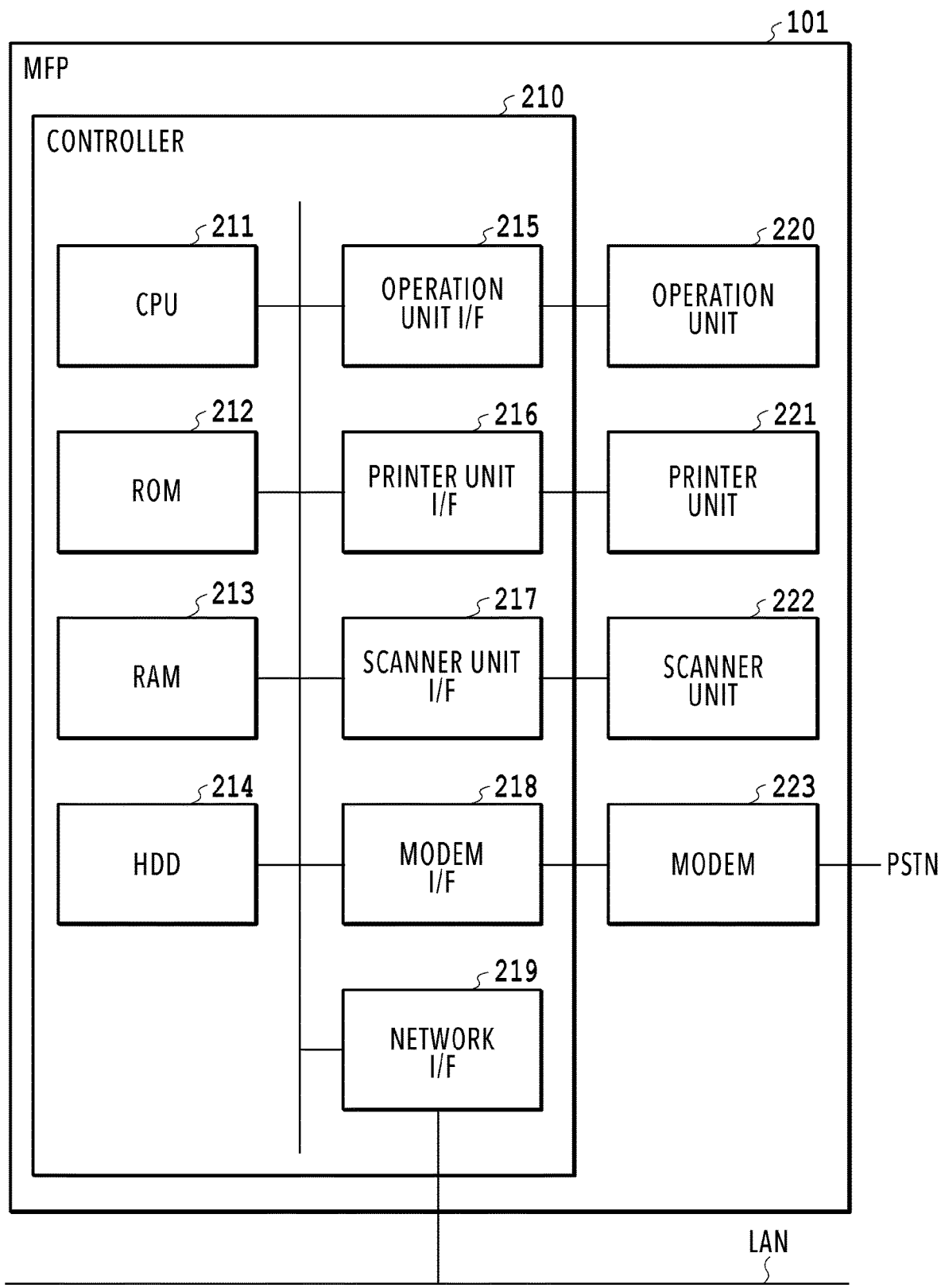
FIG. 2 is a block diagram showing an example of a hardware configuration of an MFP.

FIG. 2 is a block diagram showing an example of a hardware configuration of the MFP 101. The MFP 101 includes a controller 210, an operation unit 220, a printer unit 221, a scanner unit 222, and a modem 223. The controller 210 includes a CPU 211, a ROM 212, a RAM 213, an HDD 214, an operation unit I/F 215, a printer unit I/F 216, a scanner unit I/F 217, a modem I/F 218, and a network I/F 219, and controls an operation of the entire MFP 101.

The CPU 211 reads out a control program stored in the ROM 212 to perform the various functions of the MFP 101, such as a scan function, a print function, and a communication function, and also control the various functions. The RAM 213 is used as a temporary memory area of the CPU 211, such as a main memory or a work area. Incidentally, in the present embodiment, one CPU 211 uses one memory (RAM 213 or HDD 214) to perform processing shown in each flowchart to be described later, but the embodiment is not limited to this usage. For example, a plurality of CPUs and a plurality of RAMs or HDDs may be caused to cooperatively perform the processing of each flowchart. The HDD 214 is a hard disk drive that stores image data and various programs. The operation unit I/F 215 is an interface that connects the operation unit 220 to the controller 210. The operation unit 220 has a touch panel, a keyboard, or the like, and receives an operation, input, instructions, and the like from a user. The printer unit OF 216 is an interface that connects the printer unit 221 to the controller 210. Image data for printing is transferred via the printer unit I/F 216 from the controller 210 to the printer unit 221 to be printed on a printing medium. The scanner unit I/F 217 is an interface that connects the scanner unit 222 to the controller 210. The scanner unit 222 scans a document set on a document positioning plate or an auto document feeder (ADF) (not shown) to generate image data and input the generated image data via the scanner unit I/F 217 to the controller 210. The MFP 101 can print out (copy), from the printer unit 221, the image data generated by the scanner unit 222 and can also perform file transmission or mail transmission of the image data. The modem I/F 218 is an interface that connects the modem 223 to the controller 210. The modem 223 performs facsimile communication of the image data with the facsimile device on the PSTN. The network I/F 219 is an interface that connects the controller 210 (MFP 101) to the LAN. The MFP 101 uses the network I/F 219 to transmit the image data and information to an external device (for example, the file server 102) on a LAN 10 and receive various kinds of information.

Figure 3:
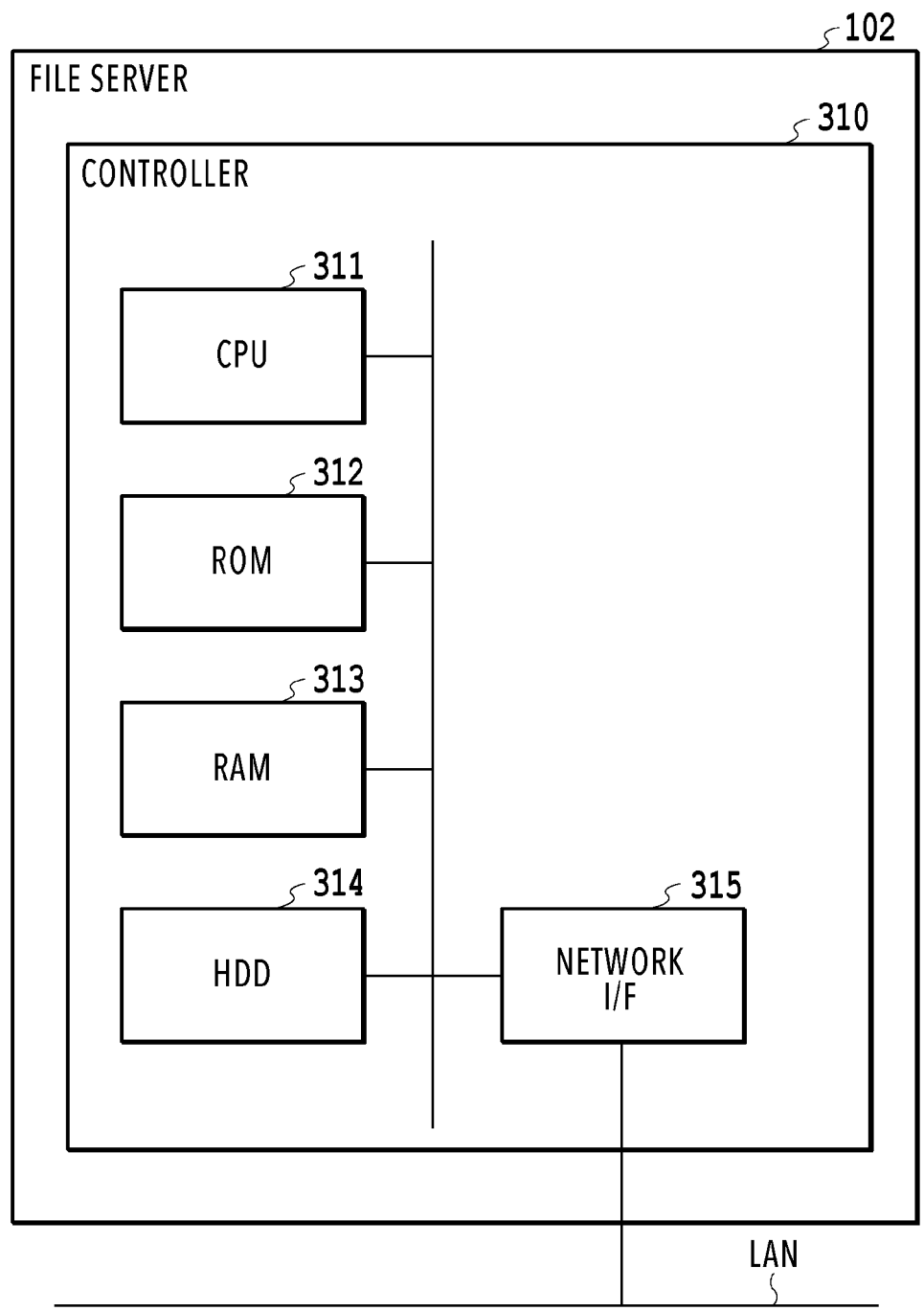
FIG. 3 is a block diagram showing an example of a hardware configuration of a file server.

FIG. 3 is a block diagram showing an example of a hardware configuration of the file server 102. The file server 102 includes a CPU 311, a ROM 312, a RAM 313, an HDD 314, and a network I/F 315. The CPU 311 reads out a control program stored in the ROM 312 to perform various kinds of processing, thereby controlling an operation of the entire file server 102. The RAM 313 is used as a temporary memory area of the CPU 311, such as a main memory or a work area. The HDD 314 is a hard disk drive that stores image data and various programs. The network I/F 315 is an interface that connects the file server 102 to the LAN. The file server 102 uses the network I/F 315 to transmit/receive various kinds of information to/from another apparatus (for example, the MFP 101) on the LAN.

Figure 4:
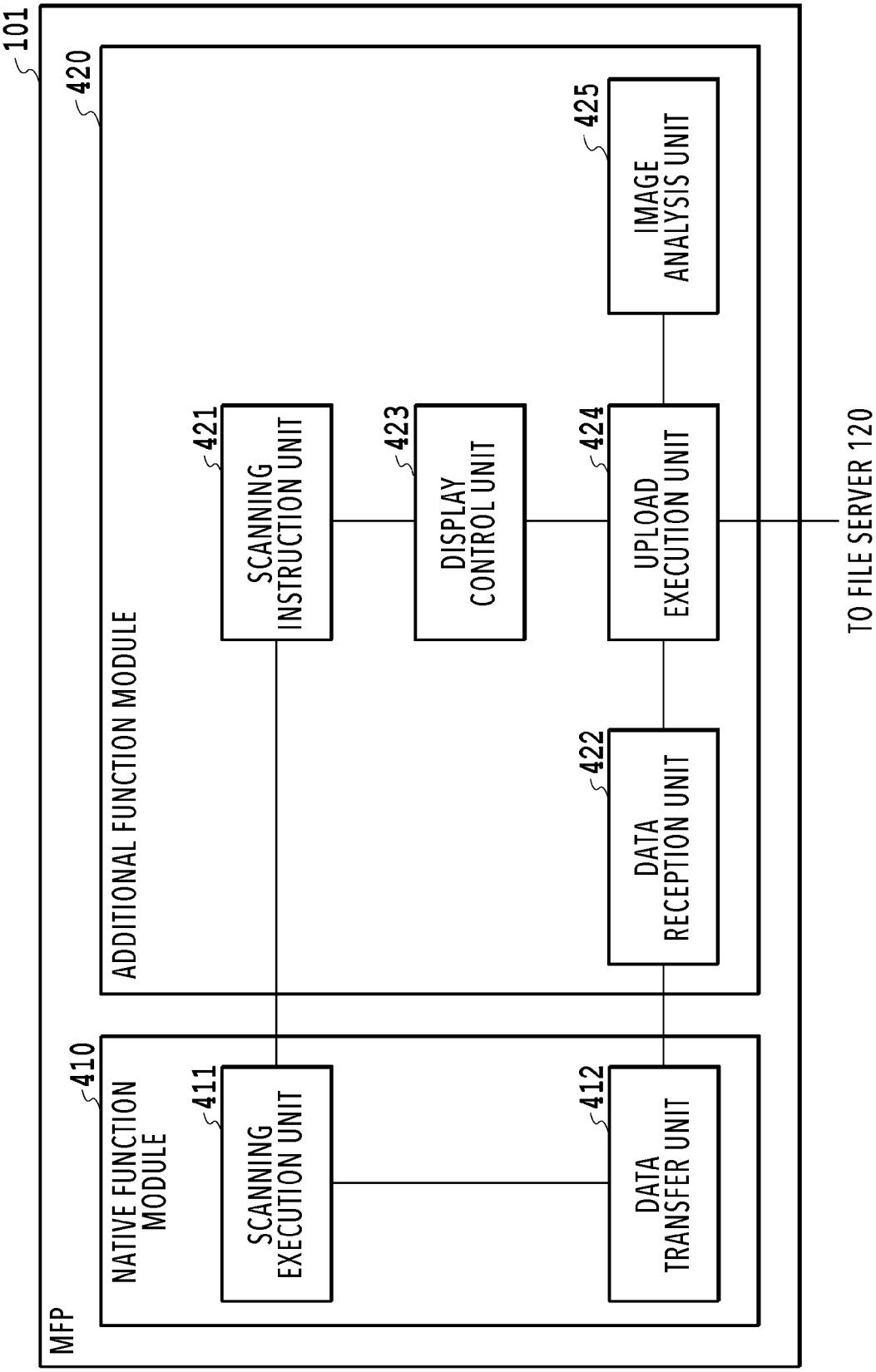
FIG. 4 is a block diagram showing an example of a software configuration of the MFP.

FIG. 4 is a block diagram showing an example of a software configuration of the MFP 101. The MFP 101 includes a native function module 410 and an additional function module 420. Individual units included in the native function module 410 are normally included in the MFP 101, whereas individual units of the additional function module 420 are applications installed additionally in the MFP 101. The additional function module 420, which is an application based on Java (registered trademark), can easily achieve addition of a function to the MFP 101. Incidentally, another additional function module (additional application) that is not shown may be installed in the MFP 101.

A display control unit 423 displays, in a liquid crystal display of the operation unit 220 in the MFP 101, a user interface (UI) screen for receiving an operation, input, instructions, and the like from a user. Incidentally, the liquid crystal display of the operation unit 220 in the present embodiment has a touch panel function. Thus, in the following description, the liquid crystal display of the operation unit 220 is simply expressed as a touch panel in some cases.

In accordance with user instructions input via the display control unit 423, a scanning instruction unit 421 transmits, to a scanning execution unit 411, information on scan settings and transfer settings included in the user instructions and also makes a scan processing request thereto.

In a case where the scanning execution unit 411 receives the scan request including the scan settings from the scanning instruction unit 421, the scanning execution unit 411 executes scan processing. More specifically, the scanning execution unit 411 causes, via the scanner unit I/F 217, the scanner unit 222 to execute scan processing, so that an image on a document placed on the document positioning plate (not shown) is scanned to generate scanned image data. The scanning execution unit 411 transmits, to a data transfer unit 412, the scanned image data generated by the scanner unit 222. The data transfer unit 412 transfers the scanned image data received from the scanning execution unit 411 in accordance with the transfer settings received from the scanning execution unit 411. As a transfer destination of the image data, it is possible to set the file server 102, a personal computer (PC) (not shown) on the LAN, or the like. However, in this case, a setting is made so that the scanned image data generated by the scanning execution unit 411 is entirely transferred once to the additional function module 420. The data transfer unit 412, which has an FTP client function, uses the FTP to transfer the scanned image data to a data reception unit 422, which has an FTP server function.

The data reception unit 422 receives the scanned image data transferred from the data transfer unit 412 and passes the data to an upload execution unit 424. The upload execution unit 424 passes the received scanned image data to an image analysis unit 425. The image analysis unit 425 performs image analysis (area identifying processing and the OCR processing [character string recognition processing]) on the scanned image data and passes, to the upload execution unit 424, information (area information and character string information) obtained from the analysis. The upload execution unit 424 passes, to the display control unit 423, the scanned image data received from the data reception unit 422 and the area information and character string information received from the image analysis unit 425.

The display control unit 423 displays, on the touch panel of the operation unit 220, a UI screen (for example, a UI screen shown in FIG. 6 to be described later) for receiving input of scan settings and another UI screen (not shown) for receiving input of folder path settings and file name settings. Additionally, the display control unit 423 can display, on the touch panel of the operation unit 220, the scanned image data received from the data reception unit 422 and the area information and character string information received from the image analysis unit 425.

In accordance with the folder path settings and file name settings received via the touch panel of the operation unit 220, the upload execution unit 424 connects to the file server 102 and uploads the scanned image data to the file server 102. Upon completion of the upload, the upload execution unit 424 notifies the display control unit 423 that the upload has been completed. The display control unit 423 updates display content in accordance with the notification from the upload execution unit 424.

Additionally, the upload execution unit 424 has a server message block (SMB) client function. This enables the upload execution unit 424 to perform file and folder operations using the SMB with respect to the file server 102, which has an SMB server function. Incidentally, in addition to the SMB, it is possible to use a distributed authoring and versioning protocol for the WWW (WebDAV) and a file transfer protocol (FTP). It is also possible to use a simple mail transfer protocol (SMTP), for example. Moreover, in addition to the above, it is also possible to use SOAP and representational state transfer (REST) for purposes other than the purpose of file transmission, for example.

Figure 5A:
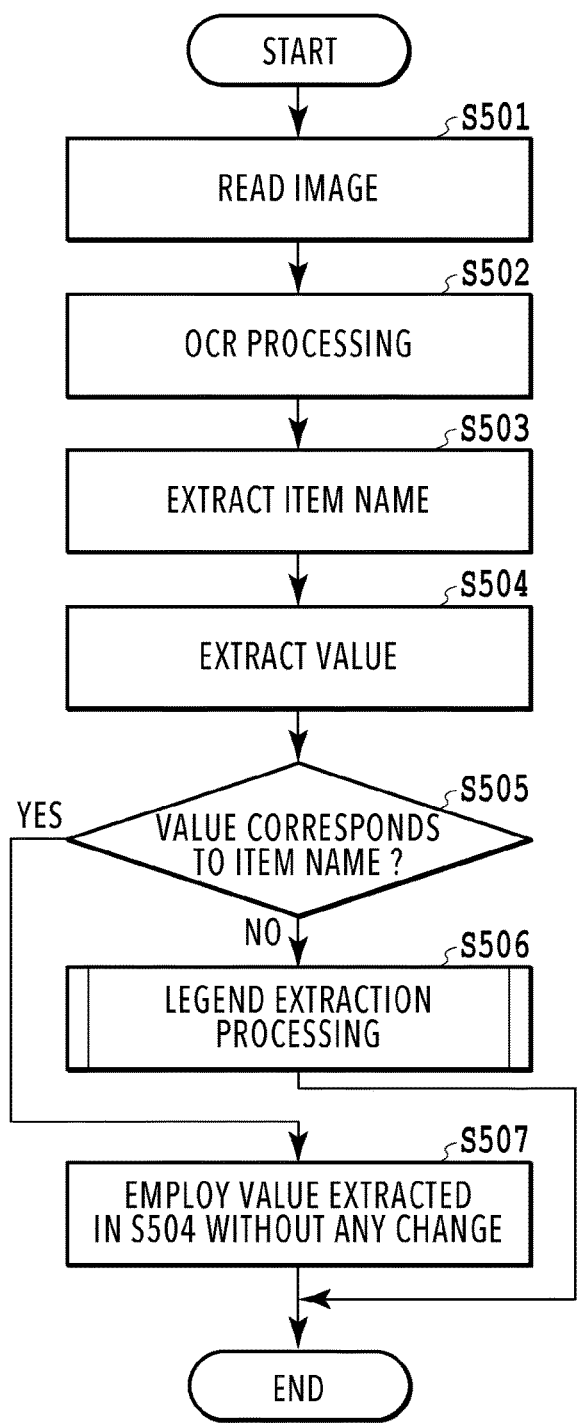
FIG. 5A is for illustrating character recognition processing performed by the MFP.

FIG. 5A is a flowchart illustrating an example of operations in which the MFP 101 performs character recognition processing on scanned image data and obtains a recognition result. A series of the operations (steps) illustrated in FIG. 5A is achieved by the CPU 211 of the MFP 101 executing a control program stored in the HDD 214.

Figure 6:
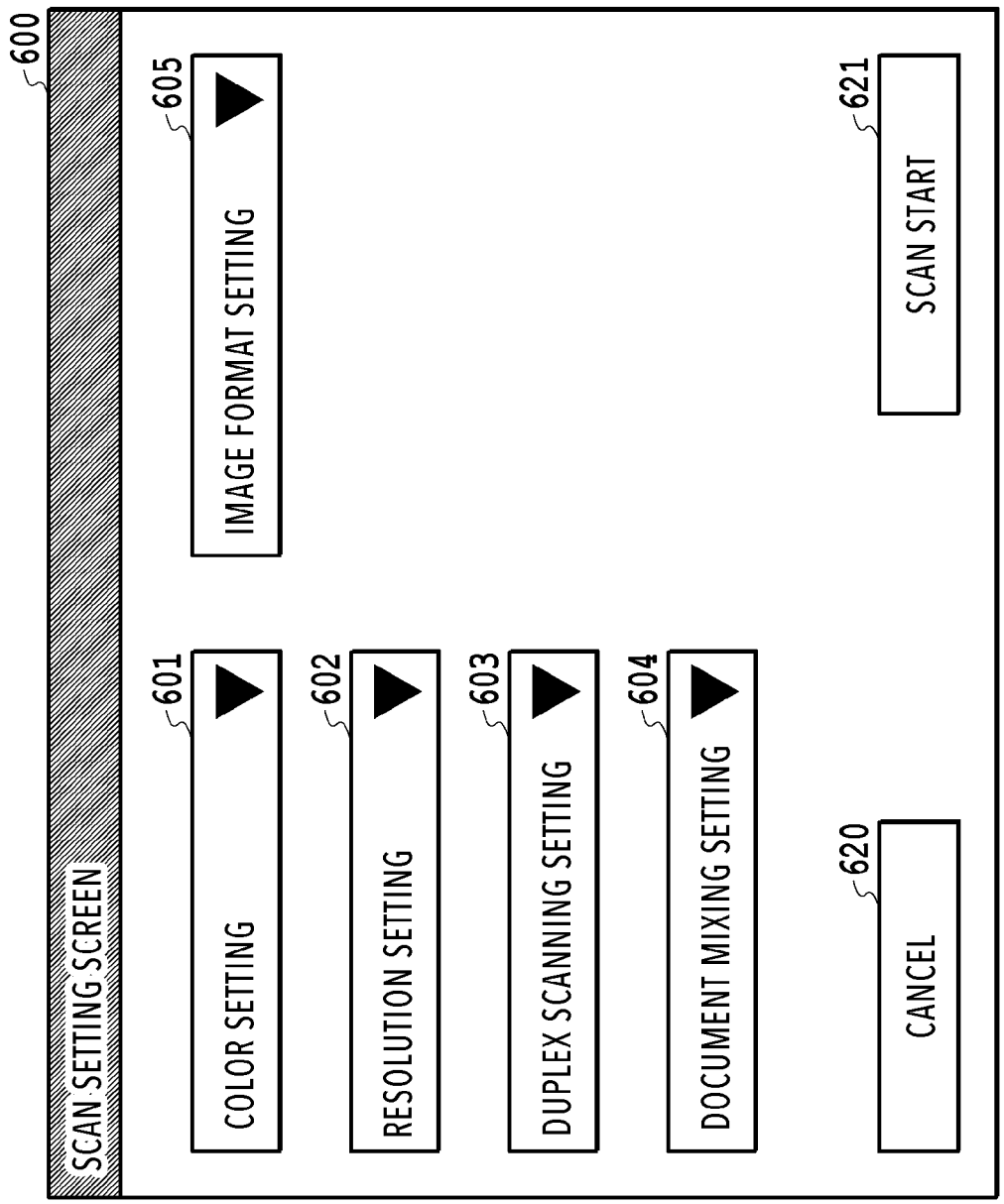
FIG. 6 shows an example of a scan setting screen.
Figure 7:
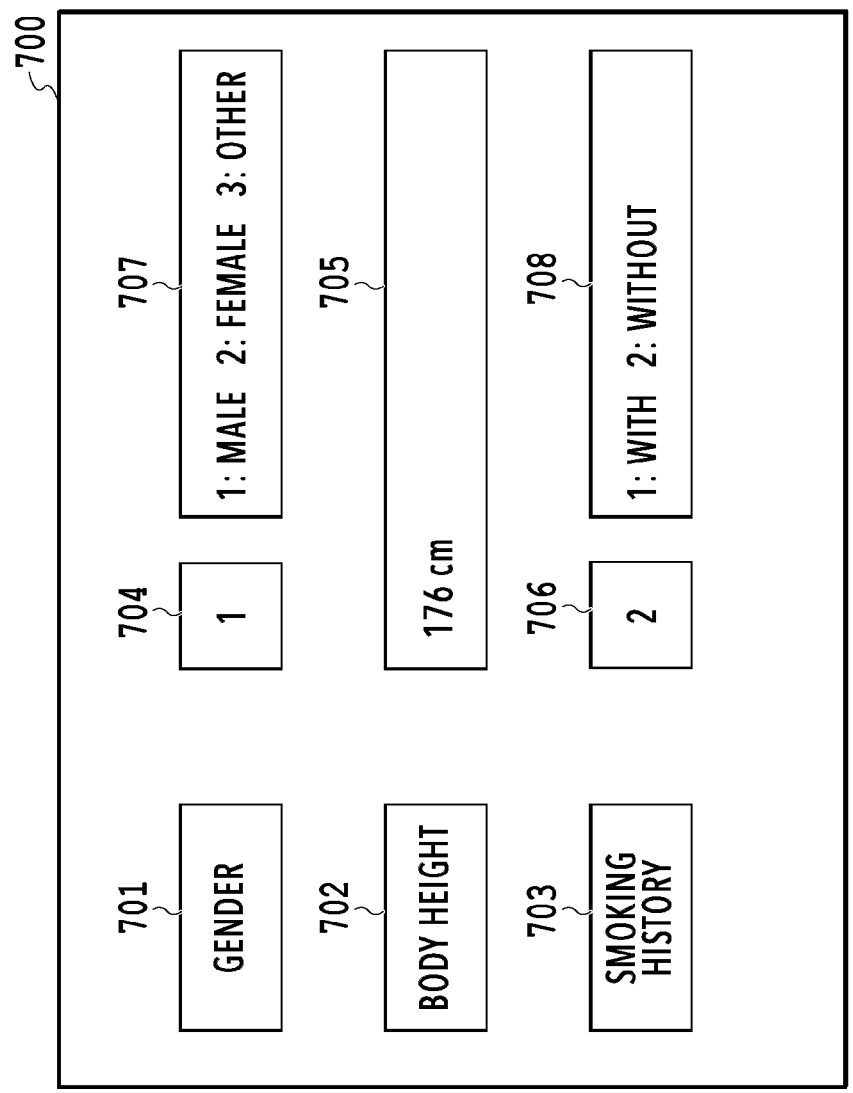
FIG. 7 shows an example of a document image.

In S501, the display control unit 423 displays, on the touch panel of the operation unit 220, a scan setting screen. FIG. 6 shows an example of the scan setting screen. In a case where a user inputs scan start instructions via a scan setting screen 600 shown in FIG. 6, the scanning execution unit 411 executes scan processing. FIG. 7 shows an image (scanned image) represented by scanned image data obtained after the scan processing. FIG. 7 shows an example of a document image, more specifically, a scanned image obtained by scanning a business form.

The user of the MFP 101 uses setting keys 601 to 605 to input, via the scan setting screen 600, settings for scan processing to be executed by the scanning execution unit 411. A color setting key 601 is for making a color or monochrome setting in a case of scanning a document. A resolution setting key 602 is for setting resolution in a case of scanning a document. A duplex-scanning setting key 603 is for making a setting of duplex scanning. A document-mixing setting key 604 is for making a setting of whether or not documents are mixed. An image-format setting key 605 is for designating a storage format of scanned image data. In these setting keys 601 to 605, candidates (options) settable within scope supported in the MFP 101 are displayed, and the user selects, from the displayed candidates, a desired one. Incidentally, each setting key described above is an example, all the setting items may not be present, and a setting item other than those described above may be present. The user makes detailed settings of scan processing via the scan setting screen 600 as described above. A cancel button 620 is used in a case where scan settings are canceled. A scan start button 621 is for providing instructions to start scan processing for a document set on the document positioning plate, for example.

In S502, the image analysis unit 425 performs the OCR processing on the scanned image data obtained in S501. In this regard, it is assumed that the scanned image data obtained in S501 represents the scanned image of the business form shown in FIG. 7. Additionally, in this case, general character-string extraction processing that has been publicly known is performed as the OCR processing. Further, in addition to the processing of extracting character strings, the OCR processing includes, for example, processing of obtaining ruled lines of a table and processing of joining ruled lines together to recognize one cell.

In S503, the image analysis unit 425 extracts, from an OCR result obtained by the OCR processing in S502, an item name to be obtained. In this regard, for example, "gender" or "body height," is conceivable as an example of the item name. As a method for determining an item name to be obtained, a conceivable method includes pre-inputting an item name to be obtained in a database or the like and selecting an item name that corresponds thereto. However, for example, on the basis of a presumption from words (character strings) that appear in the OCR result obtained by the OCR processing in S502 and their appearance positions, a character string area presumed to include an item name may be identified. In this regard, it is assumed that "gender" in an area 701 has been obtained.

In S504, the image analysis unit 425 identifies an area in which input information (a value) corresponding to the item name extracted in S503 is entered and extracts the value from the inside of the area. In this regard, as a method of extracting the value, a conceivable method includes presetting a rule such as "a value existing within a certain distance from an item name and in the right direction therefrom (right direction in FIG. 7)" and extracting the value in accordance with the rule. Additionally, for a document having the business-form format as shown in FIG. 7, a rule such as "a value in a next cell" may be set. In the example shown in FIG. 7, "1" in an area 704 is extracted as a value corresponding to the "gender" in the area 701.

In S505, the image analysis unit 425 determines whether to perform processing in a subsequent stage (processing in S506) or not. More specifically, the image analysis unit 425 determines whether the value (character string) extracted in S504 is suitable for the item name extracted in S503. In other words, in a case where the item name is "gender" as in the area 701 shown in FIG. 7, a suitable value corresponding to the item name is a character string that enables identification of gender, such as a "man" or "woman," alternatively, a "male" or "female." Meanwhile, the area 704 is identified as the position of the value, and the value actually entered in the area 704 is the value "1" entered by the user according to the legend and is unsuitable as a value indicating "gender." Incidentally, examples and the like of a suitable value corresponding to an item name may be registered together in a case of registering the item name, and the image processing system may prestore known item names and a list of value candidates of each item name. In the above-described manner, whether or not the value extracted in S504 is suitable for the item name is determined. In a case where it is determined that the value is suitable (YES in S505), in S507, the image analysis unit 425 employs, as a value corresponding to the item name, the value extracted in S504 without any change and ends the processing.

Figure 5B:
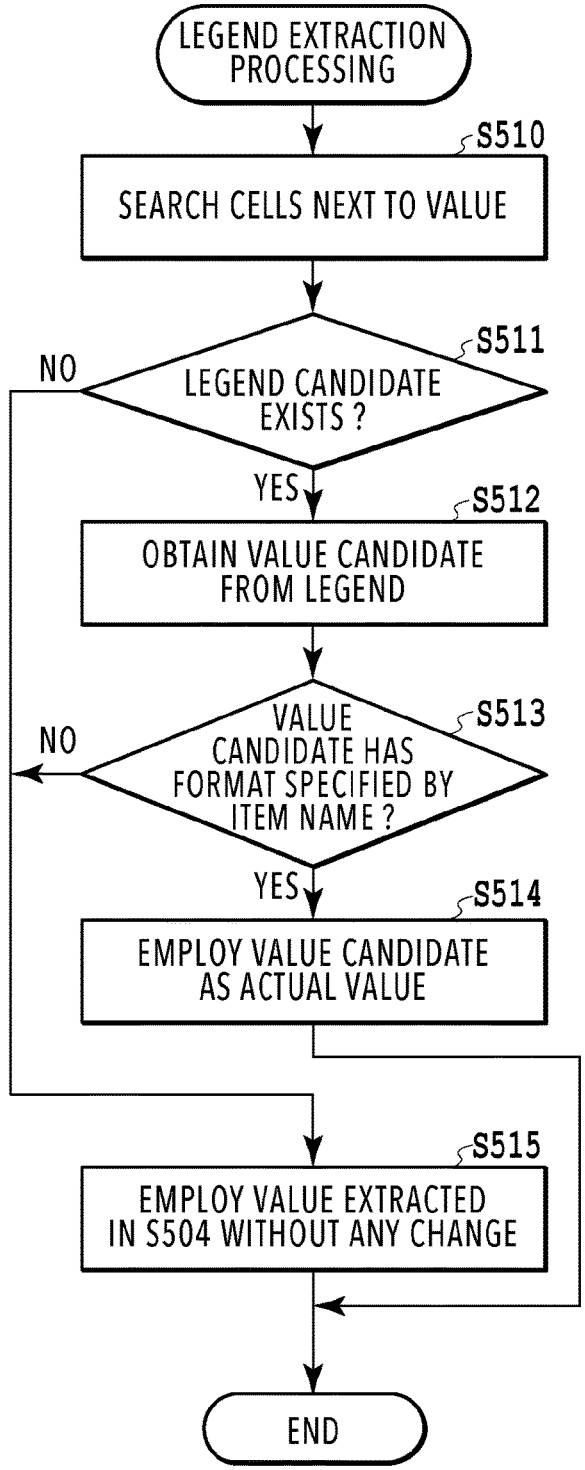
FIG. 5B is for illustrating character recognition processing performed by the MFP.

In a case where it is determined that the value is unsuitable (NO in S505), the processing advances to S506, in which the image analysis unit 425 performs processing of extracting a legend value corresponding to the value extracted in S504 (hereinafter referred to as "legend extraction processing"). Here, the legend extraction processing in S506 will be described with reference to FIG. 5B. FIG. 5B shows an example of a flow of the legend extraction processing in S506.

In S510, the image analysis unit 425 relatively searches for a position at which a legend corresponding to the item is entered on the basis of a position at which the value is entered. Here, in general, a position at which a legend is entered is conceivably a position within the same area as an area in which a value is entered or a position existing in a horizontal direction or a vertical direction with respect to the position at which the value is entered, for example, "the inside of the same cell," "a left or right cell," "a cell existing in an upward direction," or "a cell existing in a downward direction" with respect to the position at which the value is entered. Alternatively, there is conceivably a case where the legend is entered "within an area in which an item name is entered." Thus, a search is made as to whether or not there is a legend candidate at each of the positions (areas). In the present embodiment, searches are sequentially made of the above-described cells, and a legend that matches a legend format is extracted as a legend candidate. Here, the processing in S510 will be specifically described using a scanned image 700 of the business form shown in FIG. 7.

First, the image analysis unit 425 searches the inside of the cell of the area 704, identified in S504 as a position at which the value is entered, and surrounding areas around the area 704. In the present embodiment, searches are sequentially made of the inside of the cell of the area 704 and areas 701, 707, and 705, which are cells next to the area 704. Incidentally, other areas (for example, areas 706 and 708) provided with lower priority than the above areas may be included in areas to be searched.

Next, the image analysis unit 425 checks whether or not a character string entered in each searched area satisfies the legend format. In general, a legend is information including selection candidates for a value, as in "1: XXX, 2: YYY, . . . ," and has a format in which an identifier (in this case, a number) and an actual value are listed alongside. The image analysis unit 425 defines such a legend format as a character string format and determines a character string that matches the format to be a legend candidate. Incidentally, although the above-described format is shown as an example in this case, for example, the number portions may be replaced with alphabetical letters, and the portion ":" may be replaced with another symbol ";" or "." for example. Additionally, a character string that matches any of multiple formats each registered as a legend format may be employed as a legend candidate. In other words, in a case where it is possible to determine a character string that matches a defined format to be a legend candidate, the legend format and a method of registering the legend format, for example, are not limited. By using such a method of determining a legend candidate, the character string "1: MALE 2: FEMALE 3: OTHER" in an area 707 is extracted as a legend candidate in the example shown in FIG. 7. Incidentally, serial numbers or alphabetical letters arranged in ascending order are often used as identifiers included in a legend. Thus, an area including serial numbers or alphabetical letters arranged in ascending order may be prioritized and employed as a legend candidate. Moreover, in a case where areas up to an area 708 are included in areas to be searched, the character string "1: WITH 2: WITHOUT" in the area 708 is also extracted as a legend candidate. In such a case, it is possible to prioritize and extract a character string in an area (in this case, the area 707) having a shorter distance from the position at which the value is entered and having a smaller shift from the position in a linear direction. Further, in a case where there is a row of different items such as areas 702 and 705 between the areas 704 and 708, it is possible to, for example, exclude the areas 706 and 708 from candidates to be searched based on a determination that there is no corresponding legend in the rear of the row (on the lower side in the figure).

In S511, the image analysis unit 425 determines whether or not an area identified as a legend candidate exists based on a search result obtained in S510. In a case where the area exists (YES in S511), the processing advances to S512. In a case where the area does not exist (NO in S511), the processing advances to S515.

In S512, the image analysis unit 425 compares the value (character string) extracted in S504 to the legend candidate extracted in S510 to obtain a value candidate corresponding to the item name. In the example shown in FIG. 7, the area 704 is compared to the area 707. The value extracted from the area 704 is "1," and the legend candidate extracted from the area 707 is "1: MALE 2: FEMALE 3: OTHER." Thus, the "MALE," which corresponds to "1," is obtained as a value candidate corresponding to the item name "gender."

In S513, the image analysis unit 425 determines whether or not the value candidate obtained in S512 is a suitable value corresponding to the item name extracted in S503. As described earlier, in a case where the item name is "gender," a suitable value corresponding to the item name is a character string such as a "man" or "woman," alternatively, a "male" or "female." In this case, the "male" is obtained as a value candidate, and therefore, it is possible to determine that the value candidate is suitable for the item name. In a case where the value candidate is suitable for the item name (YES in S513), the processing advances to S514, in which the image analysis unit 425 employs the value candidate obtained in S512 as a value corresponding to the item name extracted in S503 and ends the processing. In a case where the value candidate is not suitable (NO in S513), the processing advances to S515.

In S515, on the basis of a result that a value corresponding to the item extracted in S503 is not obtained, the image analysis unit 425 employs the value extracted in S504 (in this case, "1") without any change and ends the processing.

Incidentally, in cases where it is impossible to obtain a suitable value corresponding to the item name from the first legend candidate (in this case, "1: MALE 2: FEMALE 3: OTHER"), there is a case where another legend candidate (legend candidate with lower priority) is extracted in S510. In such a case, it is possible to return to S512 and again attempt to obtain a value candidate from the other legend candidates.

As described above, the present embodiment makes it possible to accurately obtain a value selected by a user with respect to a selection-type item for which a legend is prepared in a situation where a value entered in a document is extracted from a scanned image of the document.

Additionally, in the present embodiment, an area having a legend entered is identified from a scanned image of a document, and the legend obtained from the area is compared to a value extracted in S503 to obtain an actual value. Thus, even in a case where a business-form format and a rule of conversion to an actual value, for example, are not prestored, it is possible to obtain an actual value of the value extracted in S503, thus enabling reduction in development cost.

Incidentally, the flows shown in FIGS. 5A and 5B are each an example, and the character recognition processing and the legend extraction processing are not limited to the above order of processing as long as it is possible to obtain a value selected by a user with respect to a selection-type item for which a legend is prepared.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention makes it possible to accurately obtain a value selected by a user with respect to a selection-type item for which a legend is prepared in a situation where a value entered in a document is extracted from a scanned image of the document.

This application claims the benefit of Japanese Patent Application No. 2019-089139, filed May 9, 2019, which is hereby incorporated by reference wherein in its entirety.

What is claimed is:

1. An image processing apparatus comprising:
at least one memory that stores a program; and
at least one processor that executes the program to perform:
obtaining an OCR result by performing an OCR processing on a document image;
extracting an item name from the OCR result of the document image, wherein the item name is a character string of a predetermined item;
extracting, from the OCR result of the document image, a first character string which exists within a predetermined distance and/or in a predetermined direction from a position of the extracted item name on the document image;
extracting a legend from the document image, wherein the legend indicates a second character string corresponding to the first character string; and
employing, as a value corresponding to the extracted item name, the second character string instead of the extracted first character string based on the extracted legend in a case where the extracted first character string is unsuitable for the extracted item name.

2. The image processing apparatus according to claim 1, wherein
the extracting of the legend is performed in a case where the extracted first character string is unsuitable as the value corresponding to the item name.

3. The image processing apparatus according to claim 1, wherein
the legend is information in which selection candidates of the value corresponding to the item name and identifiers allocated to the respective selection candidates are listed alongside, and
a selection candidate corresponding to an identifier that matches the extracted first character string in the legend is obtained as the second character string.

4. The image processing apparatus according to claim 3, wherein
in a case where the obtained second character string is unsuitable as the value corresponding to the item name, the extracted first character string is employed as the value corresponding to the item name without any change.

5. The image processing apparatus according to claim 1, wherein
the legend is extracted by searching at least any of an area including the extracted item name, an area including the extracted first character string, and surrounding areas around the area including the extracted first character string.

6. The image processing apparatus according to claim 5, wherein
the surrounding areas are areas next to the area including the first character string in a horizontal direction or a vertical direction.

7. The image processing apparatus according to claim 5, wherein
the legend is extracted by making sequential searches in accordance with priority preset for each of the area including the item name, the area including the extracted first character string, and the surrounding areas.

8. The image processing apparatus according to claim 5, wherein
in a case where the legend cannot be extracted, the extracted first character string is employed as the value corresponding to the item name without any change.

9. The image processing apparatus according to claim 1, wherein
in a case where the extracted first character string is suitable for the extracted item name, the extracted first character string is employed as the value corresponding to the extracted item name without any change.

10. The image processing apparatus according to claim 1, wherein
the document image is a scanned image obtained by scanning a business form.

11. An image processing method performed by an image processing apparatus, the method comprising:
obtaining an OCR result by performing an OCR processing on a document image;
extracting an item name from the OCR result of the document image, wherein the item name is a character string of a predetermined item;
extracting, from the OCR result of the document image, a first character string which exists within a predetermined distance and/or in a predetermined direction from a position of the extracted item name on the document image;
extracting a legend from the document image, wherein the legend indicates a second character string corresponding to the first character string; and
employing, as a value corresponding to the extracted item name, the second character string instead of the extracted first character string based on the extracted legend in a case where the extracted first character string is unsuitable for the extracted item name.

12. A non-transitory computer readable storage medium storing a program for causing a processor to perform:
obtaining an OCR result by performing an OCR processing on a document image;

extracting an item name from the OCR result of the document image, wherein the item name is a character string of a predetermined item;

extracting, from the OCR result of the document image, a first character string which exists within a predetermined distance and/or in a predetermined direction from a position of the extracted item name on the document image;

extracting a legend from the document image, wherein the legend indicates a second character string corresponding to the first character string; and employing, as a value corresponding to the extracted item name, the second character string instead of the extracted first character string based on the extracted legend in a case where the extracted first character string is unsuitable for the extracted item name.

* * * * *